June 21, 1932. C. J. H. TRUTCH 1,864,327
SYSTEM OF ELECTRIC MOTOR CONTROL
Original Filed July 18, 1927
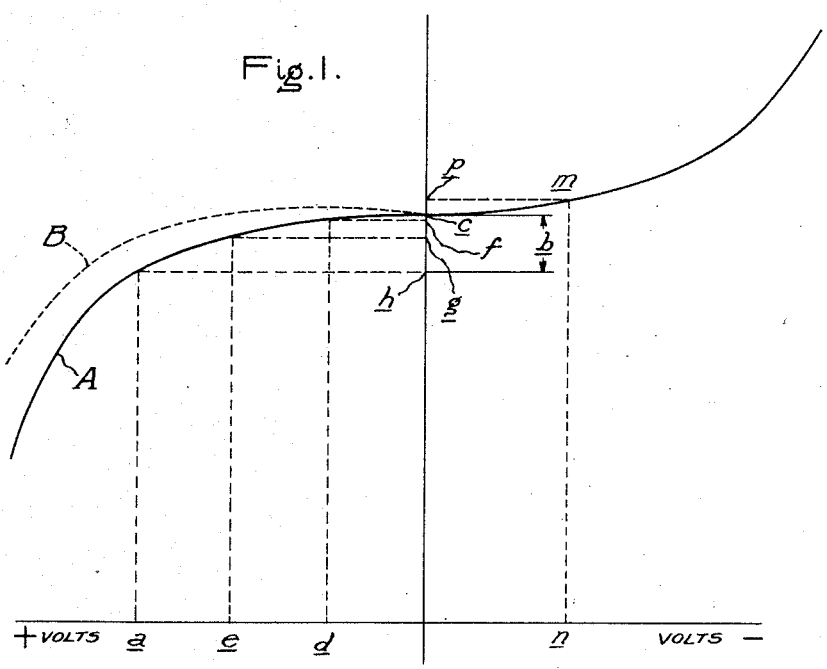
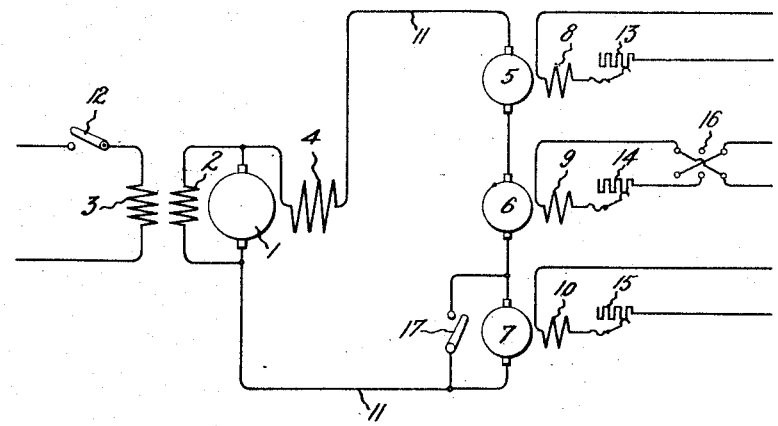
Inventor:
Charles J.H.Trutch,
by
His Attorney.

Patented June 21, 1932

1,864,327

UNITED STATES PATENT OFFICE

CHARLES JOSEPH HYDE TRUTCH, OF RUGBY, ENGLAND

SYSTEM OF ELECTRIC MOTOR CONTROL

Application filed July 18, 1927, Serial No. 206,478, and in Great Britain July 22, 1926. Renewed January 23, 1932.

My invention relates to systems of electric motor control, more particularly to motors of the direct current type.

Direct current electric motors have in the past been commonly started and controlled by means of resistances connected in series with their armatures. This system of rheostatic control involves heavy power losses in the resistances when starting. Further the maximum torque exerted by the motor is commonly limited by relays, with the consequent introduction of a time delay, due to the inertia of the parts, which, in the case of a suddenly applied load, may allow the torque to rise to a very high momentary value, before the relay has completed its function. Also, the speed torque characteristics of the motor obtainable are restricted to certain well defined shapes, such as shunt, series and combinations of these.

Certain of these disadvantages may be eliminated by the use of the well known Ward-Leonard system of control, in which the motor is supplied by a variable voltage generator. In this system the motor is started and its speed controlled by varying the excitation of the generator, so that the rehostatic losses are reduced to an almost negligible value. Further, the generator may be given certain characteristics by the provision of suitable shunt and series field windings, which enable the torque available at the motor to be limited to a definite value without the interposition of relays or other moving parts. The speed may be similarly limited and the torque speed characteristic of the motor varied between wide limits. The main disadvantage of this system is that where two or more motors are to be independently controlled, a separate generator must be provided for each motor, making the equipment both expensive and cumbersome.

The object of my invention is to provide a system, having the advantages of the Ward-Leonard system, but which is at the same time less expensive and less cumbersome. To that end this invention consists in providing one generator to supply one or more motors, the motors being started and independently controlled by variation of their field strengths.

The generator is provided with two shunt field windings and one series field winding. One shunt winding is excited from a separate constant potential source, the second shunt winding is connected across the armature terminals, that is, is self-excited, and these two windings are wound in the same sense. The series winding is wound differentially to the two shunt windings. The proportions of these windings are arranged to give a volt-ampere characteristic, such that the current variation over a wide range of voltage from zero volts, is only a small percentage of the current value at zero volts, that is, when the generator is short-circuited.

The motors are all connected in series with this generator, and provided with means of adjusting their field strength. Thus no torque is exerted by any motor so long as its field strength is zero, but upon increasing the field strength, the torque is increased up to a maximum corresponding to the maximum field strength. Further, this maximum torque can be definitely predetermined as the armature current cannot be increased with increasing mechanical load.

The motors may be started and stopped independently without appreciably affecting each other, as the current variation is small due to the shape of the generator characteristic. Any slight effect so produced would be of negligible importance in most applications, such for example as a crane or a group of ship's winches, and this effect can be largely eliminated by giving the motors suitable torque speed characteristics.

The accompanying drawing illustrates my invention diagrammatically, Fig. 1 illustrating the general type of generator characteristic that should be obtained, it being, of course understood that the scope of my invention is not limited to the exact shape of curve shown while Fig. 2 is a diagrammatic representation of a system of electric motor control embodying my invention. Referring to curve A the drop in current amounting to $b$ amps, over the voltage range from zero to $a$ volts, is not a large percentage of the short-circuit current $c$ amps. Assuming that three motors are supplied and are running under conditions of torque and speed, such that they have equal terminal voltages, the total voltage at the generator terminals being $a$ volts, the current will then be $h$ amps. Upon stopping one motor the generator voltage will fall to $e$ volts, and the current will rise to $g$ amps. This small change in current will increase the torque of the two remaining motors, tending to cause them to speed up until a new stable running condition is reached due either to the motor characteristics or the load characteristics, or in some cases an adjustment of the field strength may be necessary and may be made either automatically or by hand. Upon stopping the second motor the generator volts will fall to approximately $d$ volts, and the current will rise to approximately $f$ amps. As previously pointed out, these current changes will not be detrimental in most applications, and their effect on the speed of the motors will not be greater than those frequently experienced due to line drop in a constant voltage system. Curve B indicates the effect produced by increasing the proportion of the self-excited field winding of the generator. Fig. 2 is a diagram of connections illustrating one method of carrying out the invention, but the scope of my invention is not limited to this diagram.

The generator may be driven by any convenient means. It is a machine of standard construction, having an armature 1 and three field windings wound on its main poles. It may be fitted with commutating poles, pole face compensating windings or other devices without affecting the principle of the invention. The field winding 2 is connected in shunt across the armature; field winding 3 is excited from a separate constant potential source, and is wound in the same sense as winding 2; field winding 4 is in series with the armature, and is wound differentially to the two shunt windings 2 and 3. Connected in series with the generator are the armatures 5, 6, and 7 of three motors of standard construction. The motors are shown provided respectively with field windings 8, 9 and 10, separately excited from a constant potential source, but my invention is not limited to the use of this type of shunt wound motor. Rheostats 13, 14 and 15 are included respectively in the circuits of field windings 8, 9 and 10 for adjustment.

Assuming the field circuits of the motors to be open, then upon closing the switch 12 to complete the circuit of field winding 3, an electromotive force will be generated in armature 1 causing a current to circulate in circuit 11. This current will rise to a value $c$, Fig. 1, such that the ampere turns in winding 4 are nearly equivalent to the ampere turns in winding 3, a small resultant flux being required from winding 3 to produce an armature terminal voltage equivalent to the voltage drop in circuit 11, due to its ohmic resistance. The terminal voltage will necessarily be small, so that the effect of the small ampere turns of winding 2 may be regarded as negligible.

Upon exciting the field winding 9 of one of the motors by means of the rheostat 14 a torque will be produced tending to rotate its armature 6, and if rotation takes place an electromotive force will be generated in the armature 6 in a direction opposing the flow of the current in circuit 11. The generator voltage induced in armature 1 will rise correspondingly following the curve A, Fig. 1, so as to maintain the current flowing in circuit 11. When the motor is running at a steady speed, its electromotive force will cease to increase and a stable condition will be attained, the generator supplying a slight excess of voltage to make up the ohmic drop in circuit 11.

Similarly, upon sufficiently exciting the field windings 8 and 10 of the other two motors, their armatures 5 and 7 respectively will rotate, and the generator voltage in armature 1 will increase correspondingly along curve A, Fig. 1, so that the generator always supplies a voltage equivalent to the combined electromotive forces of the motors, plus an excess to make up the ohmic drop in the circuit. Upon reducing the current in field 9 by increasing the resistance of rheostat 14, the speed of the motor armature 6 will fall until the motor finally comes to rest. The generator voltage in armature 1 will fall with the electromotive force in armature 6, always moving along curve A (Fig. 1).

Regenerative braking can be obtained in the following manner. Suppose motor 6 to be running normally, and driving a load having appreciable inertia. To stop the motor the field strength is reduced to zero, by means of rheostat 14. The supply connections to field winding 9 are then reversed by means of reversing switch 16, and the field current again increased by means of rheostat 14. The field is now increased in the reverse direction, so that, the direction of rotation remaining as before, the direction of torque and electromotive force in armature 6 will be reversed, that is to say a braking torque will be exerted upon the load tending to stop the motor and the electromotive force will be now in the same direction as the current tending to increase it. Assuming that only one motor is running, then the voltage generated in the generator armature 1 will fall to zero when the motor field is reduced to zero, and when the motor field is built up again in the reverse direction, as described above, the generator voltage will build up in the reverse direction following the curve $c\,m$, Fig. 1, as the motor electromotive force and the current in circuit 11 increases. Depending upon the field strength of the motor and its speed, the generator voltage will rise to some value such as $n$ volts, corresponding to a current $p$ amps, and the motor will generate an electromotive force in its armature 6 slightly in excess of this value by an amount sufficient to make up the ohmic drop in circuit 11. The electromotive force in generator armature 1 being now in opposition to the current, this machine becomes a motor and receiving electrical energy from the motor armature 6, it will return mechanical energy to the driving means. In the case of a steam or oil driven prime-mover some or all of this energy would be absorbed in mechanical friction, or in the case of an electric motor being used to drive the generator armature 1, this motor could return excess power to the supply system.

In the event of one or more motors being braked at the same time that other motors are exerting positive torque to drive their respective loads, it is evident that the generator will then supply or absorb the balance of energy according as this is positive or negative, its voltage coming automatically to a corresponding value along the curve in Fig. 1.

Similarly, braking may be obtained in the case of a falling load, such as for example, when lowering a load on a crane. The field is excited in the direction required for hoisting, but to a strength that produces insufficient torque to hold the load. The load then falls under the action of gravity and rotates the motor in the reverse direction, producing an electromotive force in armature 6 in the same direction as the current. The motor then acts as a generator as described above.

In order to save power and reduce the heating of the motors, each motor may be provided with an armature short-circuiting switch 17 arranged to be closed when the motor is not in use.

What I claim as new and desire to secure by Letters Patent of the United States is:—

1. A control system comprising a plurality of direct current motors, a direct current generator, a normally closed series circuit for the armatures of all the motors and the armature of said direct current generator, field windings for the generator comprising a separately excited shunt winding, a self-excited shunt winding, and a differential series winding adapted to give a voltage-current characteristic such that the percentage current variation in said series circuit over a wide range of voltage from zero volts is small, separately excited fields for said motors, and means for independent field control of each motor.

2. A motor control system comprising a direct current generator, a plurality of direct current motors having their armatures connected with the armature of said generator in a permanently closed series circuit, a separately excited field winding for each of said motors, and a separate means in circuit with each of said motor field windings for controlling the starting, stopping, and speed of each of said motors while its armature remains connected in said series circuit; said generator having an inherent constant current, varying voltage characteristic whereby operation of the field control means to vary the speed of any of said motors from full operating value to zero is substantially ineffective to vary the speed-torque characteristic of the remaining motors in said circuit.

3. A control system comprising a plurality of direct current motors, each being provided with an armature and a separately excited field winding, a direct current generator provided with an armature, a normally closed series circuit for the armatures of said motors, and the armature of said generator, said generator having a voltage current characteristic such that upon variations in the fields of said motors, the percentage current variation in said series circuit over a wide range of voltage from zero volts is small, and means for independent field control of each motor.

In witness whereof, I have hereunto set my hand this fifth day of July, 1927.

CHARLES JOSEPH HYDE TRUTCH.